United States Patent
Beshidze et al.

(10) Patent No.: US 11,556,903 B2
(45) Date of Patent: Jan. 17, 2023

(54) METHOD AND APPLICATION FOR AUTOMATING AUTOMOBILE SERVICE PROVIDER TRACKING AND COMMUNICATIONS

(71) Applicant: VB Solutions, LLC, Annapolis, MD (US)

(72) Inventors: Victor Beshidze, Annapolis, MD (US); Suheil Katan, Annapolis, MD (US)

(73) Assignee: VB Solutions, LLC, Annapolis, MD (US)

( * ) Notice: Subject to any disclaimer, the term of this patent is extended or adjusted under 35 U.S.C. 154(b) by 0 days.

(21) Appl. No.: 17/176,482

(22) Filed: Feb. 16, 2021

(65) Prior Publication Data

US 2022/0067670 A1 Mar. 3, 2022

Related U.S. Application Data (60) Provisional application No. 63/072,182, filed on Aug. 30, 2020.

(51) Int. Cl.
*G06Q 10/00* (2012.01)
*G06Q 30/00* (2012.01)
(Continued)

(52) U.S. Cl.
CPC .......... *G06Q 10/20* (2013.01); *G06F 3/0482* (2013.01); *G06F 3/0488* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 9,646,345 B1 * | 5/2017 | Leise | G07C 5/00 |
| 2005/0075968 A1 * | 4/2005 | Apostolides | G06Q 10/06 705/38 |

(Continued)

*Primary Examiner* — Crystol Stewart
(74) *Attorney, Agent, or Firm* — Laubscher & Laubscher P.C.

(57) ABSTRACT

A computer-implemented method for automating service provider status and reporting during a service visit includes the initial steps of creating a service provider transaction, initiating the transaction, and calculating an estimated completion time of the transaction. The estimated completion time is based on at least one service condition, which may include the availability of servicing tools and components, the availability of service provider employees, the priority status, if any, of the service provider transaction, and the level of difficulty of service provider transaction, among others. Preferably, the service conditions include constant or variable associated values. The completion time is calculated based upon a sum of these values. If an unexpected service need or service delay arises, the service provider transaction status is updated, which includes recalculating the estimated time of completion based on a new service condition that arose from the unexpected need or delay. When the service provider transaction is complete, the customer reviews the transaction, confirms that the service provider transaction is complete, and schedules a service completion event.

8 Claims, 8 Drawing Sheets

(51) Int. Cl.
*G06Q 10/10* (2012.01)
*G06Q 10/06* (2012.01)
*G06F 3/0482* (2013.01)
*H04W 4/029* (2018.01)
*G06F 11/30* (2006.01)
*G06F 3/0488* (2022.01)

(52) U.S. Cl.
CPC ... *G06F 11/3089* (2013.01); *G06Q 10/06312* (2013.01); *G06Q 10/06313* (2013.01); *G06Q 10/109* (2013.01); *G06Q 30/016* (2013.01); *H04W 4/029* (2018.02)

(56) References Cited

U.S. PATENT DOCUMENTS

| | | | |
|---|---|---|---|
| 2006/0129444 A1* | 6/2006 | Baeza | G06Q 10/109 705/7.19 |
| 2006/0229928 A1* | 10/2006 | Nix, Jr. | G06Q 10/063 705/7.31 |
| 2009/0106036 A1* | 4/2009 | Tamura | G06Q 10/109 705/305 |
| 2010/0153162 A1* | 6/2010 | Tam | G06Q 10/109 705/26.1 |
| 2013/0325541 A1* | 12/2013 | Capriotti | G06Q 10/087 705/7.21 |
| 2014/0188999 A1* | 7/2014 | Leonard | H04L 12/1859 709/204 |
| 2015/0039522 A1* | 2/2015 | Dillard | G06Q 10/20 705/305 |
| 2015/0227894 A1* | 8/2015 | Mapes, Jr. | G06Q 10/20 705/305 |
| 2016/0162817 A1* | 6/2016 | Grimaldi | G06Q 10/0633 705/7.27 |
| 2016/0292759 A1* | 10/2016 | Gonzalez Miranda | G06F 3/04845 |
| 2018/0121885 A1* | 5/2018 | Baco | H04B 7/26 |
| 2018/0253700 A1* | 9/2018 | Coquillette | G06Q 10/06311 |
| 2019/0050783 A1* | 2/2019 | Gutierrez Sanchez | G06Q 10/20 |
| 2020/0065776 A1* | 2/2020 | Kingsley | G06Q 10/20 |

* cited by examiner

METHOD AND APPLICATION FOR AUTOMATING AUTOMOBILE SERVICE PROVIDER TRACKING AND COMMUNICATIONS

This application claims benefit of U.S. provisional patent application No. 63/072,182 filed on Aug. 30, 2020, the contents of which are incorporated in their entirety by reference herein.

BACKGROUND

The present disclosure relates generally to automobile service visits, and more particularly to real-time tracking and reporting of the status of automobile service visits.

Automobile service visits have been around for as long as automobiles have been available for purchase. The typical service visit involves scheduling an appointment with a service provider, being given an approximate time frame for when the services will be complete, and then waiting to hear from the service provider regarding the status of the service. The wait period may include hours, days, or sometimes even weeks to receive a service update from a service provider.

Some service providers may focus on customer service and, in turn, have developed communication processes for informing a customer of the timeline and advances of a particular service visit. These communications typically involve phone calls, emails or similar updates. Though such processes are beneficial, there is a need for a streamlined process of internal and external communications related to automobile service visits.

SUMMARY OF THE DISCLOSURE

Accordingly, it is an object of the present disclosure to provide a computer-implemented method for automating service provider status and reporting during a servicing visit for a device, such as an automobile. The method includes the initial steps of creating a service provider transaction, initiating the transaction and calculating an estimated completion time of the transaction. The estimated completion time is based on at least one service condition, which may include the availability of servicing tools and components, the availability of service provider employees, the priority status, if any, of the service provider transaction, and the level of difficulty of the service provider transaction, among others. Preferably, the service conditions include associated values. The completion time is calculated based upon a sum of the associated values.

A service provider transaction status is provided to the customer throughout the servicing visit. If an unexpected servicing need or servicing delay arises, the service provider transaction status is updated, which includes recalculating the estimated time of completion based on a new service condition that arose from the unexpected need or delay. The customer is informed when the service provider transaction is complete. Preferably, the customer reviews the transaction, confirms that the service provider transaction is complete, and schedules a service completion event.

In one embodiment of the method, the values associated with the service conditions are constant. In another embodiment, the values are variable and the completion time is continually calculated and updated based on changes in the variable values.

In yet another embodiment, to confirm the completed service provider transaction, the customer electronically signs the completed transaction. In this embodiment, scheduling the service completion event includes providing the customer with predetermined dates and times to select based on service provider conditions, such as the availability of service provider employees, the amount of space available at the service provider facility to hold the serviced automobile, and the time required to have the automobile available to the customer.

It is further an object of the present disclosure to provide an electronic device, including a display, at least one processor and memory. The memory has a first module configured for execution by the processor to perform the method steps disclosed above, and a second module that displays graphical, interactive user interface images that include a road having a starting point, an ending point and a plurality of checkpoints arranged in spaced relation therebetween. The graphical user interface further includes an automobile arranged at the starting point, ending point or plurality of checkpoints which moves along the road during the service provider visit, as well as a banner that shows an estimated time of completion for the service provider visit.

In one embodiment, the display includes a touch-sensitive user interface, and when a user contacts an icon on the display, a status of the service visit is displayed.

In another embodiment, the display includes a point-and-click user interface, and when a user clicks an icon on the display, a status of the service visit is displayed.

BRIEF DESCRIPTION OF THE DRAWINGS

Other objects and advantages of the disclosure will become apparent from a study of the following specification when viewed in the light of the accompanying drawing, in which.

DETAILED DESCRIPTION

Figure 1:
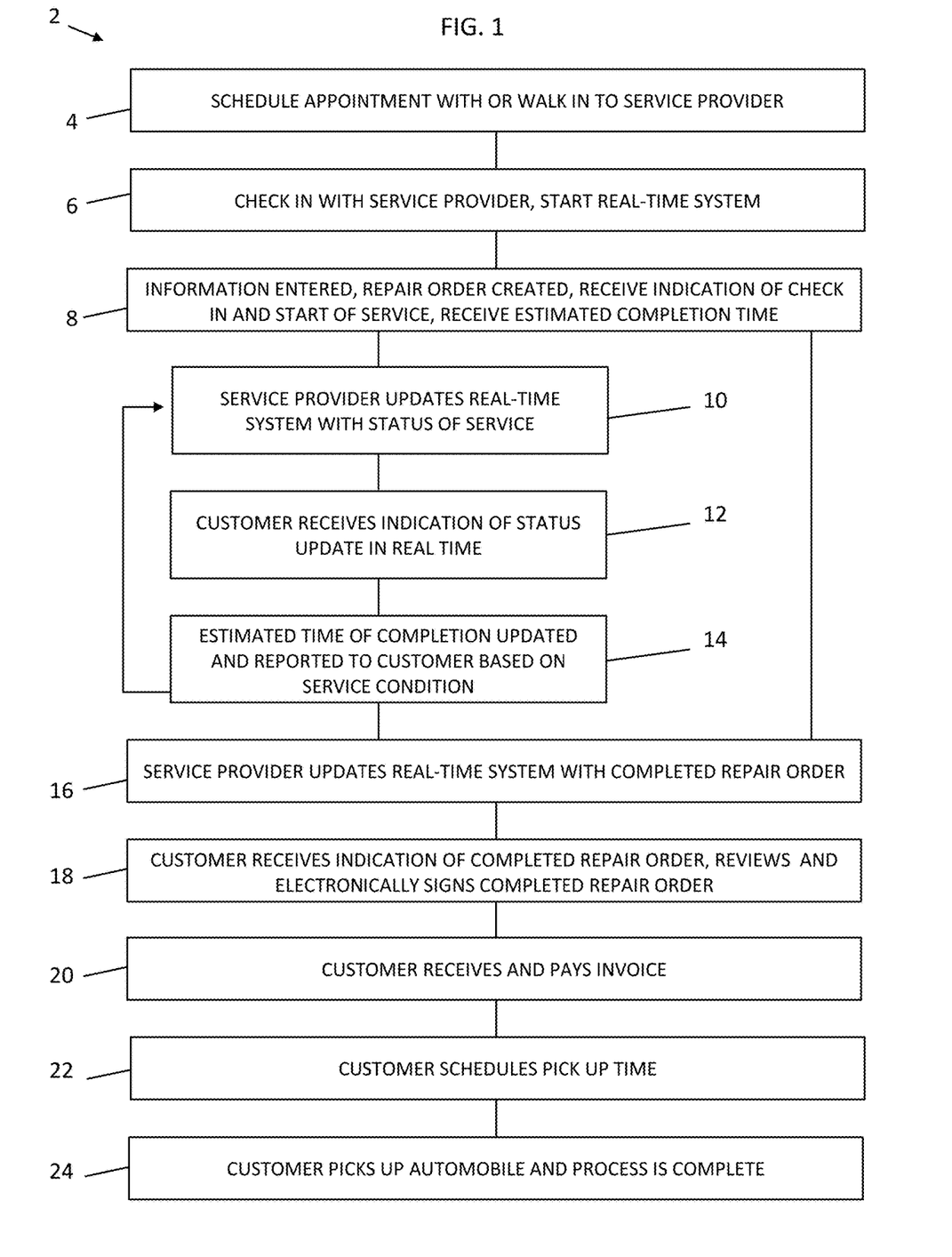
FIG. 1 shows a flow chart of a preferred method for providing real-time communication to an automobile service customer.

Referring to FIG. 1, there is shown a computer-implemented method for automating automobile service provider tracking and communications during a service provider visit 2. A customer accesses an application through downloadable software or a web-based application and creates a username and associated profile, including relevant automobile information for at least one automobile. Once an account is created, the user locates automobile service providers that offer services through the application and selects a service provider with which to schedule a service visit. The service visit is scheduled through the application 4, the user chooses a time to bring his/her automobile to the service provider, and the service provider confirms the time or provides an alternate time. The user can select this alternate time or chose a different time. The service provider includes the entire service team, including service advisor, service director/cashier, and service coordinator, to name a few. Others could also be a part of the service team. Alternatively, the user can schedule an appointment directly through the service provider, or simply walk in the service center 4, and have the service provider initiate the process through the software application. Any automobile service that could be provided by an automobile dealership service center, an individual mechanic, or any other automobile service entity are applicable to this disclosure.

Figure 2:
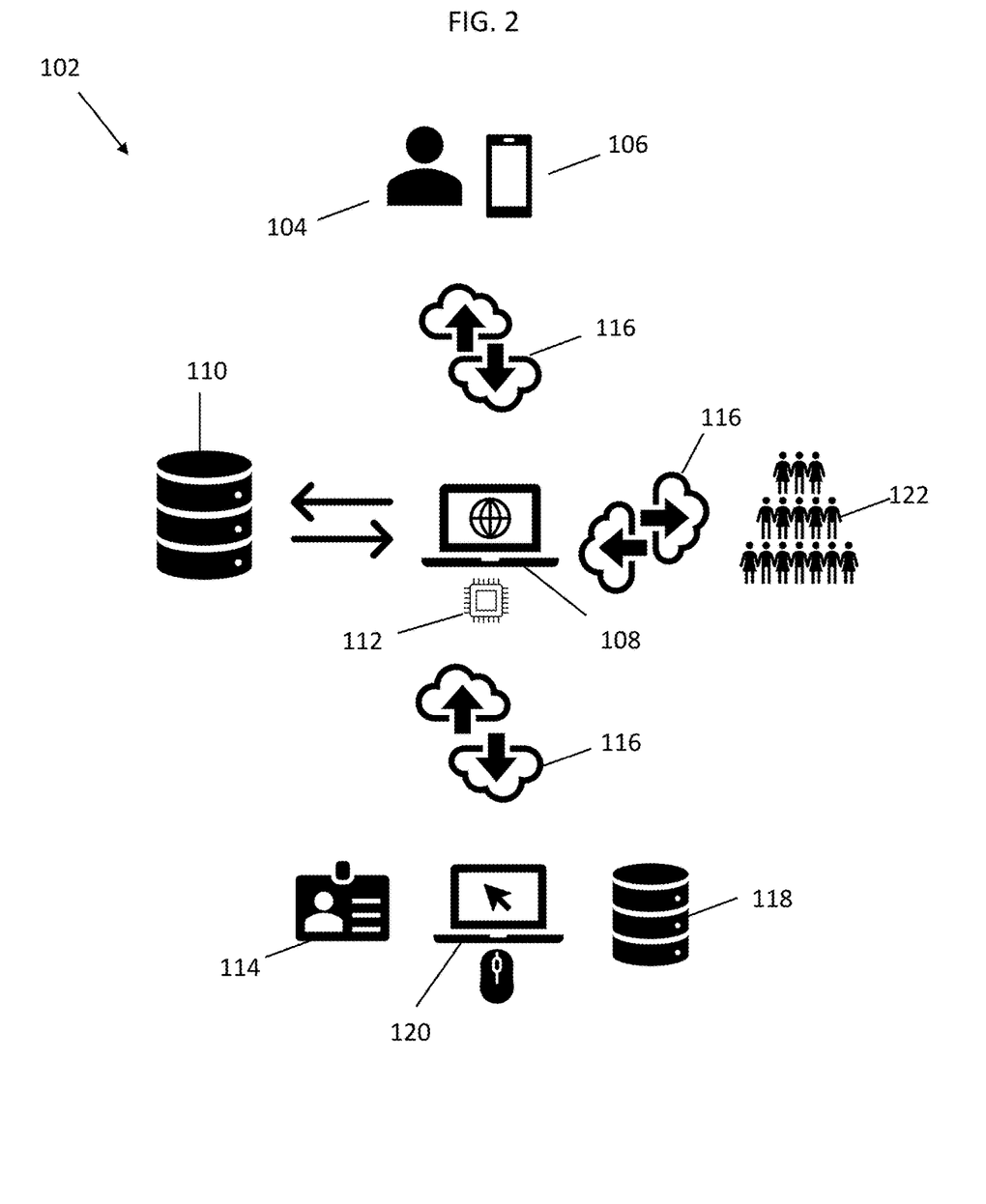
FIG. 2 shows a schematic demonstrating one embodiment of the methods of the present disclosure.
Figure 3:
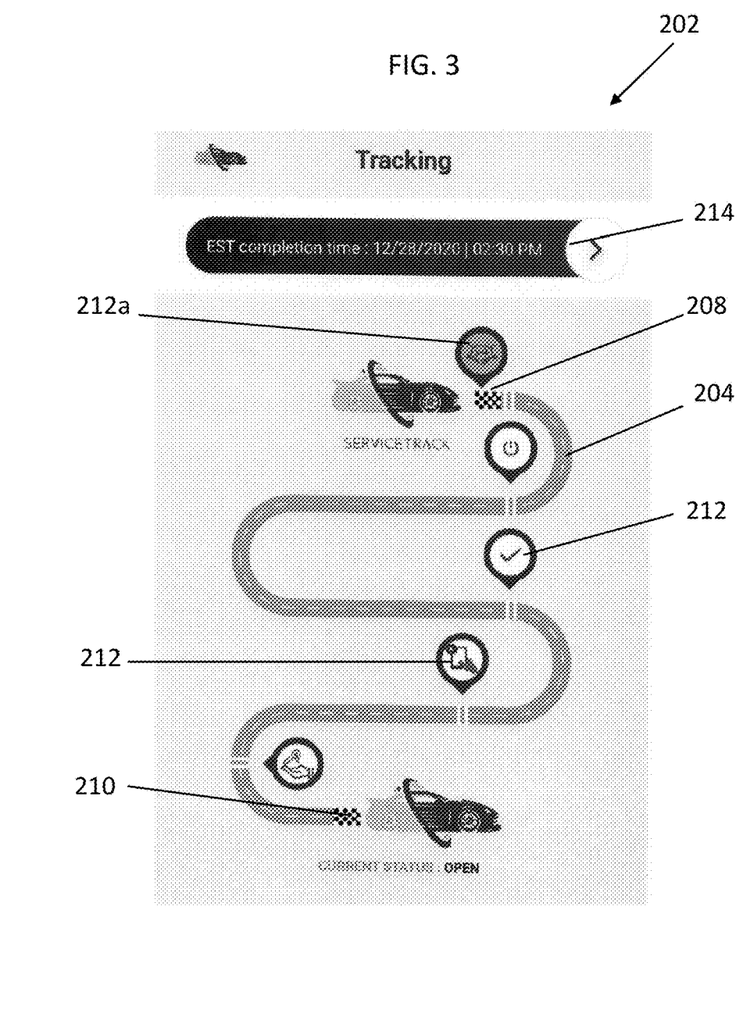
FIGS. 3-11 show various sequences, respectively, of an embodiment of a graphical user interface of an automobile service provider software program according to the present disclosure.
Figure 4:
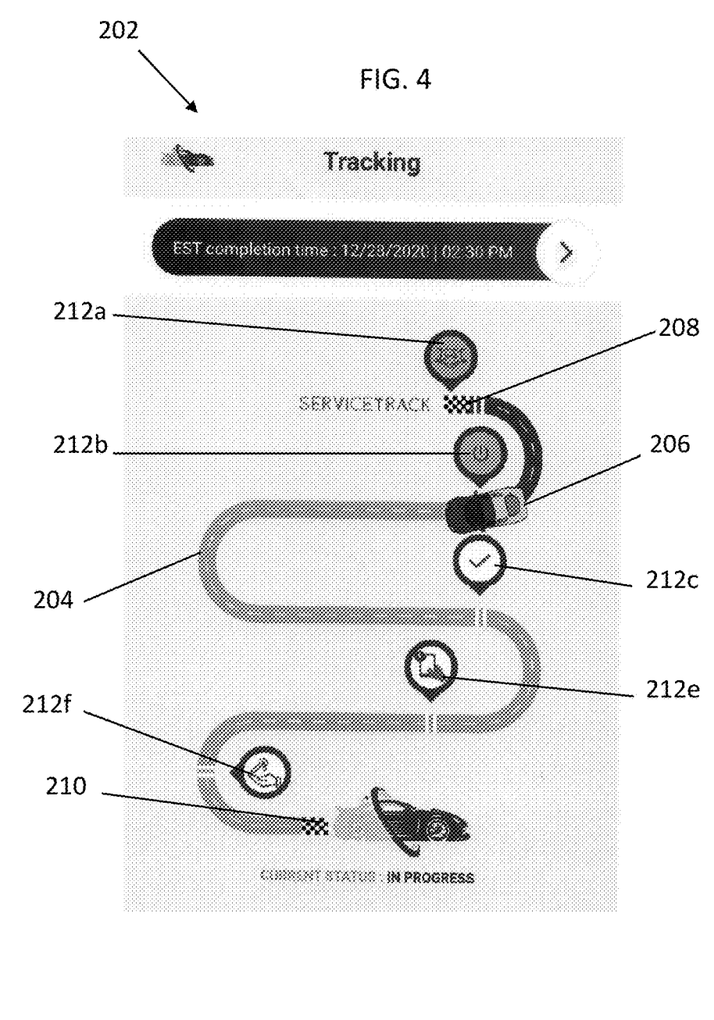
Figures 5, 6:
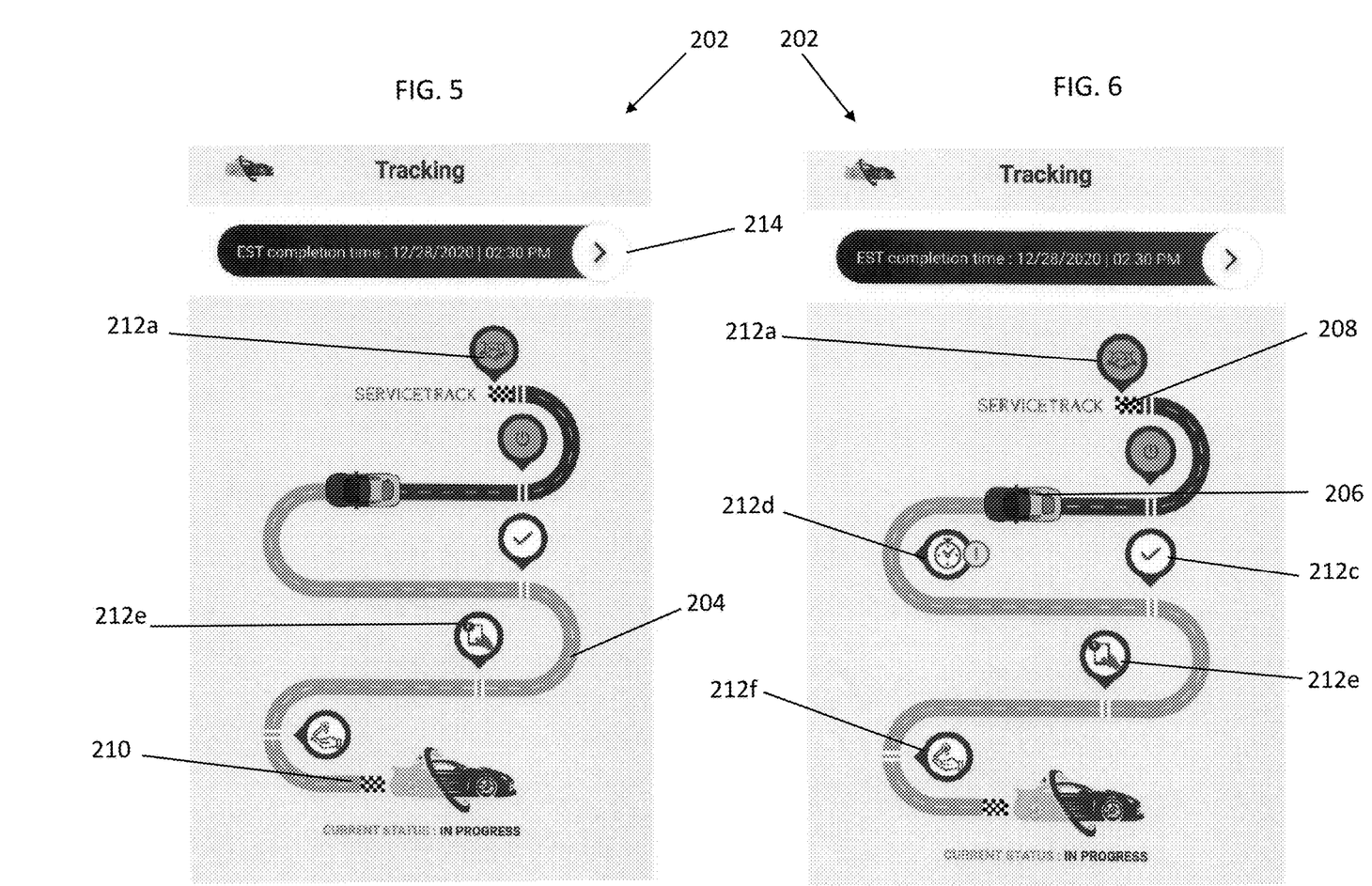
Figure 7:
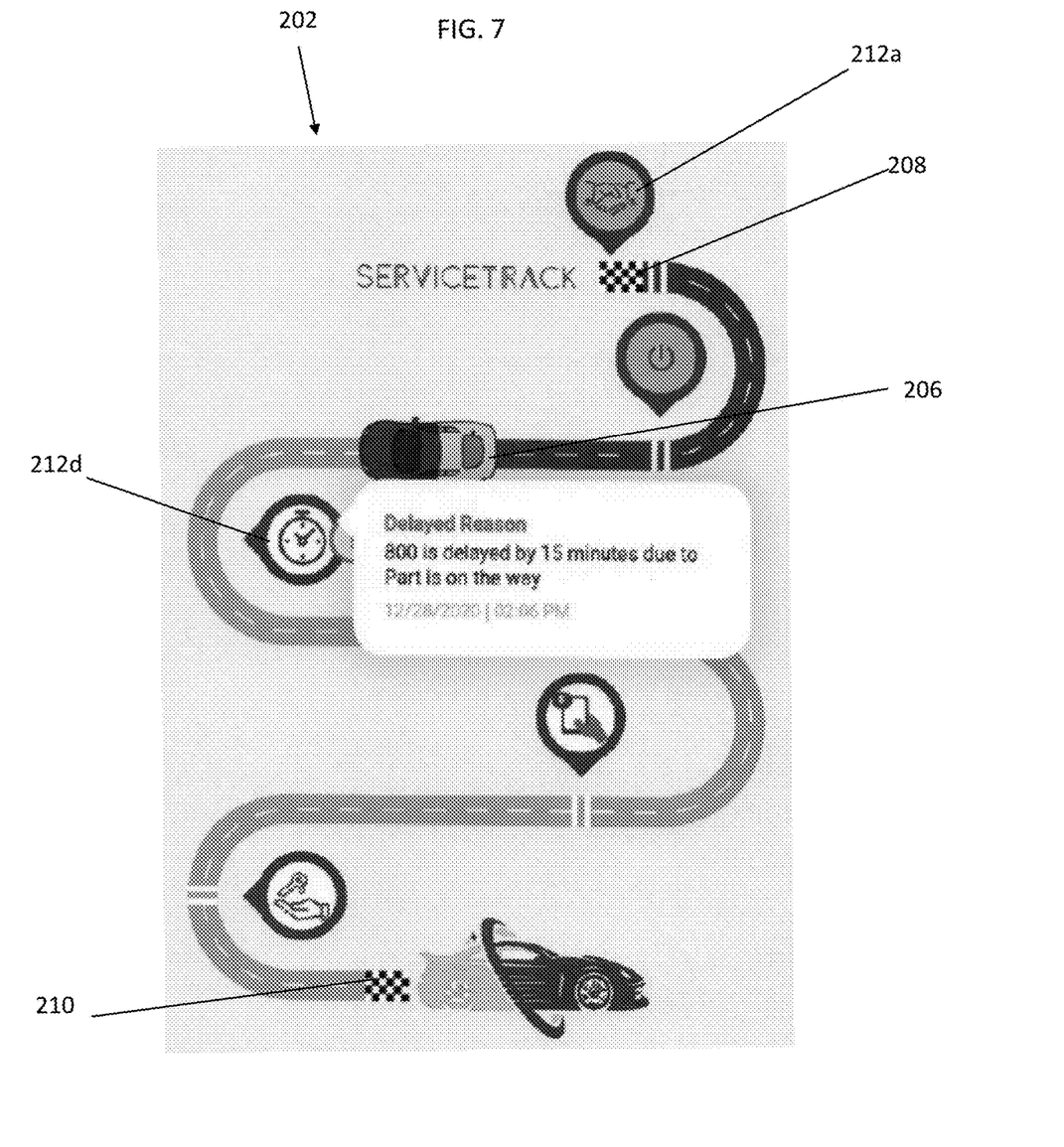

When the customer arrives at the service center and checks in with the service provider 6, there is a real-time status and tracking system that begins 6. As shown in FIG. 2, the real-time status and tracking system includes a customer/user side of the application that has a graphical user interface (GUI) and a service provider application side that may or may not have a graphical user interface. The service side of the application includes computer-based data input fields. The application is connected with a processor and memory to receive, process, and store data related to automobiles and service visits. The memory can store data locally or remotely.

Referring again to FIG. 1, the service provider enters information for a repair order ticket in the application 8 for reference by its mechanics, managers, and other members of the service provider team. When entered, the processor automatically creates a repair order 8, stores it in memory, and provides the repair order to the user and service provider via a computer network. The customer receives a notification 8 within the application via the network and application that he/she is checked in and that the repair order has been created. Simultaneously, the service team is informed that the automobile is ready for service, and the customer GUI tracking display begins. After the repair order is completed, an estimated start and completion time will be determined 8 by an individual or by the processor based on the service to be completed, the number and nature of other active repair orders, the status of those repair orders, the number of mechanics available to provide the service of the repair order, and any other factors that would affect the completion time of the repair order. This is determined based on comparable data stored in a computer-readable storage that the processor accesses through computer-executable instructions. The program automatically informs the service provider and user of the expected timeline via a computer network and the application. This information is presented to the user through a novel graphical user interface, which is described in detail below.

When the repair order services begin, the mechanic, manager, or other member of the service provider team notes this within a service provider application, and the customer is automatically updated in real-time that the services have begun 8. If needed, the estimated service time of completion (ESTC) is updated based on any changes in parameters that determined the previous ESTC.

While servicing the automobile, if the service provider has issues or set-backs in completing the service, or if something causes a delay within the service provider shop, the provider notes that in the system, with an explanation of the issues 10. The processor and executable instructions automatically recalculate the ESTC based on data relative to the issues found in the computer-readable storage, the service provider's estimated time to overcome the issues, and typical timeframes of past performance. The customer is automatically informed of the issues 12 and the updated timeline 14. If the issues have the potential to lead to additional issues, the processor will include those with the update to the user. Alternatively, rather than having the provider note the issues and provide an explanation, some issues, such as delays within the service provider shop or a backordered product, can automatically be communicated to the customer.

The user can at that time, and any time during the process, interact with the service provider through the application, whether via a chat window within the application, a telephone call, a comments section, selecting predefined radio buttons, or other direct methods of communication. If the issues require new authorization from the customer/user, the update can include a request for authorization, which the customer/user can provide, and the service provider can receive, in real-time through the application. This can be especially beneficial during repair orders that are diagnostic in nature. Once diagnostics have been completed, a customer/user can immediately choose between a range of options that will immediately be sent to the service provider via the computer network and processor, streamlining the entire process.

The above process 10, 12, 14 is repeated for any additional issues/set-backs, questions, or concerns that occur during the repair order service visit. During the automobile service process, the customer has complete access to the progress of vehicle via real-time notifications through the mobile and/or web application so that the line of communication is always open, whether the customer is at the service facility, home or office.

Once the service provider completes the service, the customer receives an update and the completed repair order 16. The customer then reviews the repair order, and so long as it is correct and acceptable, the customer electronically signs the repair order 18. At that time, an invoice is sent to the customer to complete payment 20. Once the payment is made, the customer chooses a time to retrieve the automobile 22. Preferably, the schedule of times to retrieve the vehicle includes a preferred window of time for the service provider based on other scheduled automobile retrieval times, available employees, upcoming new visits, during business hours or special retrieval times, and other variables. This is automatically determined by the processor, executable instructions and data in the computer readable storage. The customer retrieves the car at the scheduled time 24, which is then indicated in the application, and the service visit is noted as complete. All of the above steps can be completed without the need for face-to-face contact between the customer and service provider.

FIG. 2 is a schematic diagram showing one way in which the interaction 102 between a customer or customers, the network which processes the methods disclosed herein, and the service provider can be implemented. A customer 104 initiates a service transaction through a computer 106 such as a mobile device which is processed via a remote computer 108 having a database 110, computer-readable instructions and a processor 112 to implement the method described above. Once the service transaction is initiated, it is sent to the service provider 114 via the network 116 to be affirmed and for the service transaction to commence. The service visit is entered into the service provider database 118, and memory from the service provider database is accessed to assist in implementing the service methods disclosed above. Alternatively, the service provider can enter and initiate the process, and the customer will receive a notice of the entered service visit via the network.

Once the service transaction begins, the estimated completion time is calculated based on conditions present from information in the service provider database 118 and with the remote computer 108, processor 112 and database 110. The remote computer, processor and database could be associated with a specific service provider, or a publicly accessible database that includes information relative to service provider transactions can be used. It will be understood by those with skill in the art that more than one database and network could be accessed in furtherance of implementing the methods described herein.

The conditions referenced for determining an ESTC, such as the availability of servicing tools and components, the availability of service provider employees, the priority status, if any, of a service provider transaction, and the level of difficulty of a service provider transaction, among others, are available on the service provider database or other databases. The computer-readable instructions stored on the remote computer query the service provider database and other databases for such conditions and other relevant information in determining the ESTC. Conditions are given associated values and/or weights which are used to calculate the ESTC.

The completion of time is provided to the customer via the network 116 to the customer mobile device 106. The completion time remains constant and is only changed if an unexpected service need or delay arises. For instance, if during the service visit, the service provider determines that additional services are needed beyond those initially presented to the customer, the service provider updates the system through the service provider computer 120. This update is communicated to the network computer 108 and processor 112 and the estimated completion time is updated. The estimated completion time may be updated based on a value associated with the unexpected service need or delay alone, or might be recalculated by querying the service provider database and other databases to obtain all conditions relevant to the service visit. The status of the service visit is then updated and the customer receives the updated status via the network.

Alternatively, the estimated time of completion is continuously updated. This process involves continuous queries to the service provider database 118 or other databases, or a process whereby when service provider conditions change, they are automatically communicated to the remote computer 108 via the network 116. Whether requested by the remote computer 108 or sent by the service provider computer 120, conditions that are potentially relevant to a service visit are continuously evaluated and the completion time is recalculated for any variance in a condition. Status changes are automatically communicated to the customer mobile device 106.

Numerous customers 122 can use and interact with the system at one time. Information from all customers is communicated through the remote computer 108 and network 116, processed via the processor 112, database 110 and computer-readable instructions, and communicated to the service provider 114 or service providers. The customer service visits and any relevant conditions associated with each service visit are aggregated within the system to assist with calculating an estimated completion of time for each customer. These conditions are accessible by the service provider servicing an automobile or by a network of service providers to provide a greater amount of data from which to calculate expected completion times or other relevant servicing information. This information could be anonymous or include customer and/or service provider identifiers.

Referring now to FIGS. 3-11, an embodiment of a graphical user interface (GUI) 202 for an application that implements the above methods is shown. The GUI 202 includes a schematic of a road 204 and automobile 206 traveling along the road. There are start 208 and complete 210 locations, and checkpoints 212 between the two. During a visit, the automobile approaches, stops at and passes through each checkpoint. The position of the automobile is associated with the above-described method for scheduling and completing an automobile service visit. Each designated location 208, 210, 212 on the GUI is one step in the above method.

The automobile will begin at the handshake icon 212a, also referred to herein as the service order indicator, at the time of scheduling a visit with the automobile service provider, which will turn green when the visit is scheduled. Once the automobile is at the service center, which may be at the time of scheduling the visit or may be at a later time, the servicing department, whether managers, mechanics, or other employees, are notified via the system that a service visit has been scheduled and the automobile is ready for servicing. There is then an estimated expected start time entered into the system. This could be automatic based on factors analyzed by the system, or could be individually determined and entered by an employee at the service center based on availability of mechanics and the number of other automobiles currently being serviced. The amount of time will vary, but will preferably be a short period of time, for instance 15 minutes.

Preferably, there will be notices set between the handshake icon 212a and the start icon 212b to indicate that the start of the service visit is approaching. For instance, if a 15-minute estimated start time is set, after five minutes, there will be a yellow warning signal displayed to both the user's screen and mechanic's screen to inform each that the start time is approaching. When five more minutes pass, a red warning signal will be displayed, indicating that it is almost time to begin servicing the automobile.

Once the mechanic retrieves the automobile, drives it into the servicing shop, and begins to service the vehicle, the start icon 212b will turn green. This will preferably be from the mechanic engaging a start button with the system, whether on a computer, tablet, or other device. It will be understood by those with ordinary skill in the art that other methods for turning the start icon green and beginning the service visit could be used. For instance, it may automatically turn green at the expiration of the estimated start time or via an entry of servicing information by the mechanic into the system. Preferably, throughout this process, the automobile 206 will move incrementally between the handshake icon 212a and start icon 212b at a linear rate of change relative to the expected start time. For instance, if the start time is expected to be one hour after check in, the portion between the handshake icon and start icon may be divided into sixty equal intervals noted by the processor but not shown on the GUI. The automobile will move along each interval every minute toward the start symbol. It will be understood by those with skill in the art that the intervals and perceived movement of the automobile can vary. Once the start icon 212b is turned green, an estimated time of completion for the service visit is calculated and reported to the application user 214 and service provider.

Again, once the automobile service visit begins and is noted by the mechanic, the start icon 212b will change colors (preferably from white to green) to indicate to the customer/user that the automobile is being serviced. The start symbol in FIG. 3 has not yet changed colors because the automobile 206 has not reached that icon yet. In FIGS. 4-11, the automobile has reached or passed through the start icon, and thus the icon color has changed. As is shown throughout FIGS. 3-11, there are white icons for icons that have not been visited by the automobile 206 and shaded icons for icons that have been visited.

Following the start icon 212b, also referred to herein as the start point icon, there is a completion icon 212c shown as a checkmark, also referred to herein as the end point indicator which is switched from white to shaded when the service provider has completed servicing the automobile. In use, that will preferably be changed from white to green. As is shown in FIGS. 6-11, there may be an alert icon 212d between the start 208 and complete 210 locations, which will be displayed if there is an issue that arises while servicing the vehicle, as discussed in the method steps above. When an issue arises, the service provider enters an explanation of the issue in the real-time application, and the customer is automatically informed of the issue via the alert icon 212c. The real-time system then recalculates the estimated time of completion 214, as described above, and reports that change on the GUI. In addition, the position of the automobile 206 between the start 208 and complete 210 locations is adjusted to accurately reflect the new estimated time of completion. For instance, had the automobile been halfway through a two hour visit (i.e. one hour remaining), the position of the automobile would have been halfway between the start and complete icons. Then, if an issue arose that added 30 minutes to the completion time, the estimated time of completion would be updated to 30 minutes later than the initial estimate, and the automobile of the GUI would be updated. Because the one hour of the now two and a half hour estimated visit has been completed, the automobile would move toward the start icon to a position that shows the automobile is approximately ⅖ of its way from the start icon to the complete icon.

Once the service is complete, the mechanic indicates this and the checkmark icon 212c changes colors. The service center, whether manually or automatically, with then set a completion time between the finish of servicing the vehicle and when the invoice will be ready for the customer to review. This process is similar to the process for the estimated start time as described above. As time elapses, the automobile 206 on the GUI 202 moves toward the invoice icon 212e at a rate related to the expected time to process and invoice the service visit. Once at the invoice icon, the customer receives the repair order (RO) to be reviewed and signed electronically. Once that is complete, the customer is automatically directed to submit payment and choose a time to pick up the automobile. So long as the pick-up time is within business hours, the request is automatically accepted. As with the other steps in the process, the automobile 206 of the GUI 202 travels along the road of the GUI toward the pickup icon 212l at a rate related to the scheduled pickup time. Alternatively, the automobile of the GUI can remain at the invoice icon 212e until the automobile is picked up. It could also remain at any point between the invoice and pick up icons. Once the customer retrieves the automobile, the GUI indicates this by shading the pickup icon 212f and removing the automobile from the GUI. Again, it is preferred that each icon change from white to green when a step in the process is completed. The process is then noted as complete on the GUI. The pickup icon 212f and invoice icon 212e may also be referred to herein as a checkout indicator.

Once the customer picks up the vehicle, they will be prompted to rate the service provider and the service center, along with ratings for the use of the application.

Figure 12:
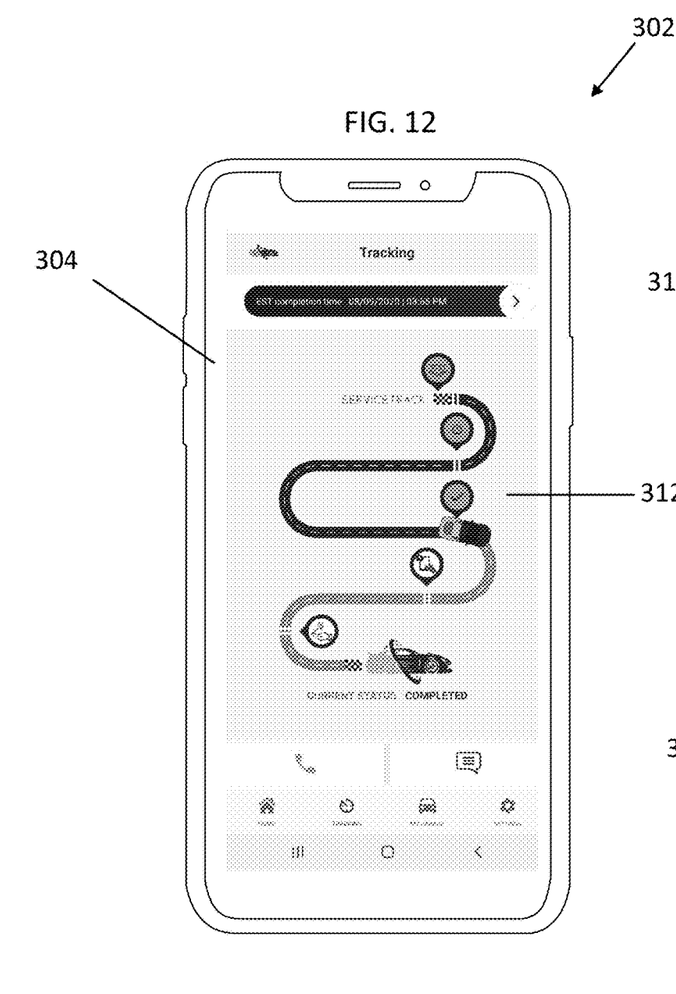
FIGS. 12 and 13 show various displays, respectively, of an embodiment of a device having a graphical user interface according to the present disclosure.
Figure 13:
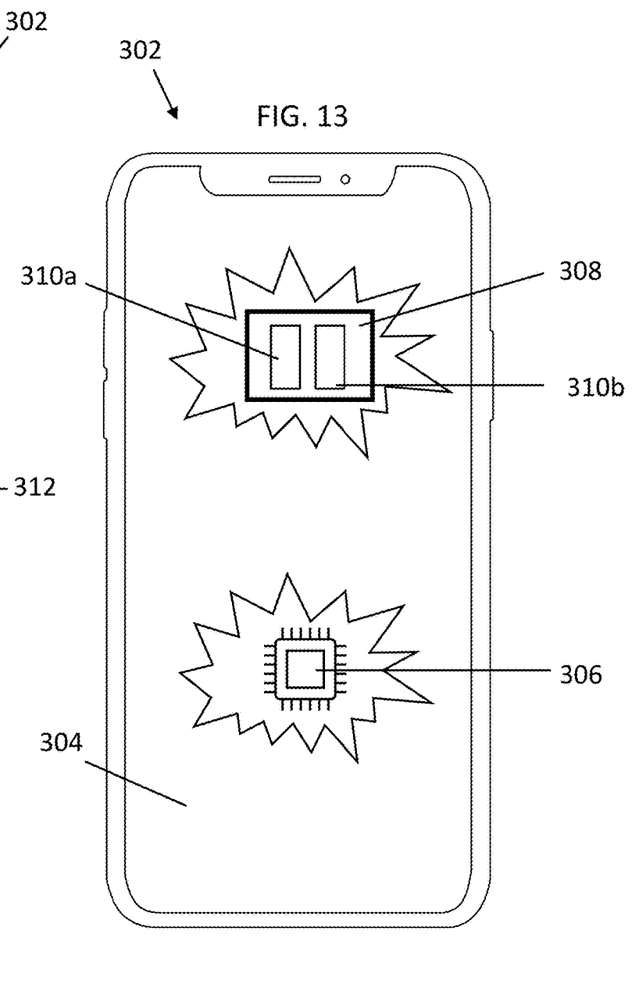

Referring now to FIGS. 12 and 13, there is shown an electronic device 302 that includes a display 304, a processor 306, and memory 308, which has two modules 310a, 310b stored thereon. One module 310a is configured for execution by the processor 306 to perform the method step disclosed herein, and the other module 310b is configured for execution by the processor 306 to display the graphical user interface 312 shown in FIGS. 3-12. The display 304 of FIG. 12 is a touch-sensitive display that allows for interactive contact by a user. It will be understood by those with skill in the art that other devices and displays, such as a point-and-click personal computer, could be used to show the display of FIG. 12.

The graphical user interface 312 of FIG. 12 includes a road having a starting location, an ending location, a plurality of checkpoint icons, and an automobile, as discussed in detail above in FIGS. 3-11. It will be understood by those with skill in the art that other icons can be included. Though the automobile in FIG. 12 is shown located at the ending point icon, the display 304 will show the automobile travelling along the road during the service visit, beginning at the starting point, moving to the checkpoints and finishing at the ending point, as discussed above and shown in FIGS. 3-11.

Figure 8:
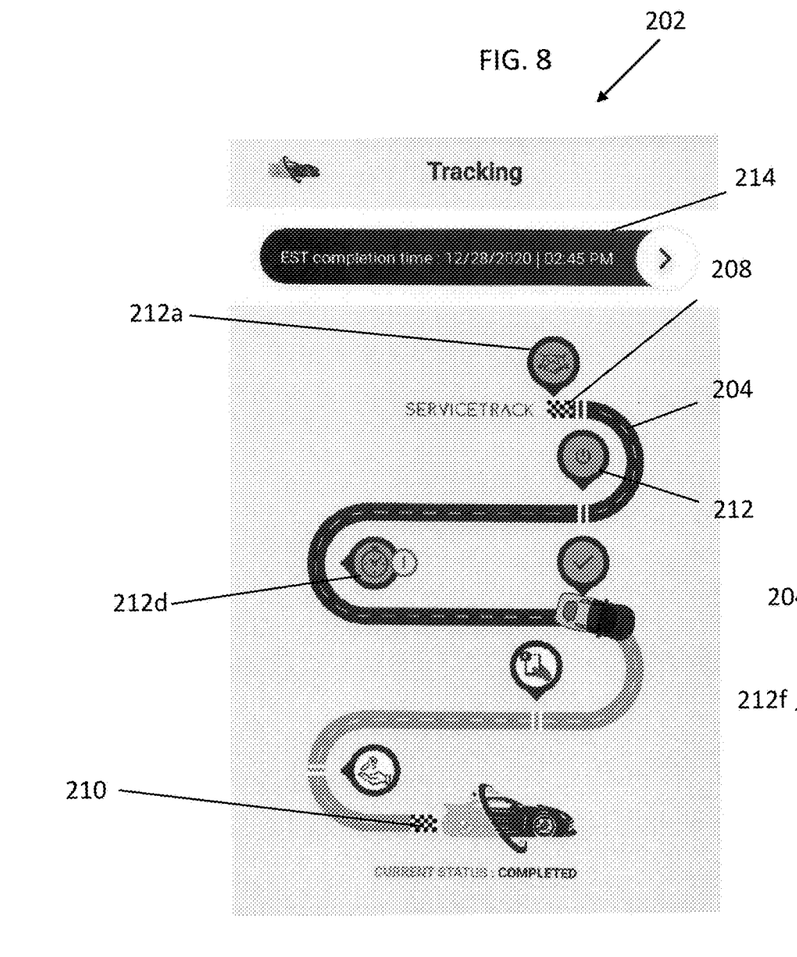
Figure 9:
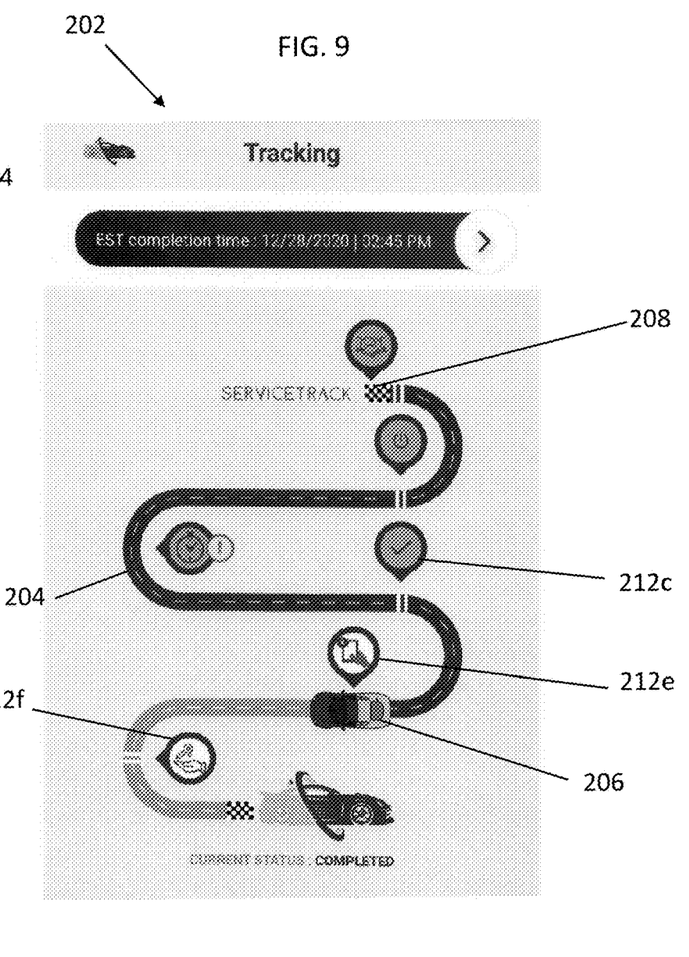
Figure 10:
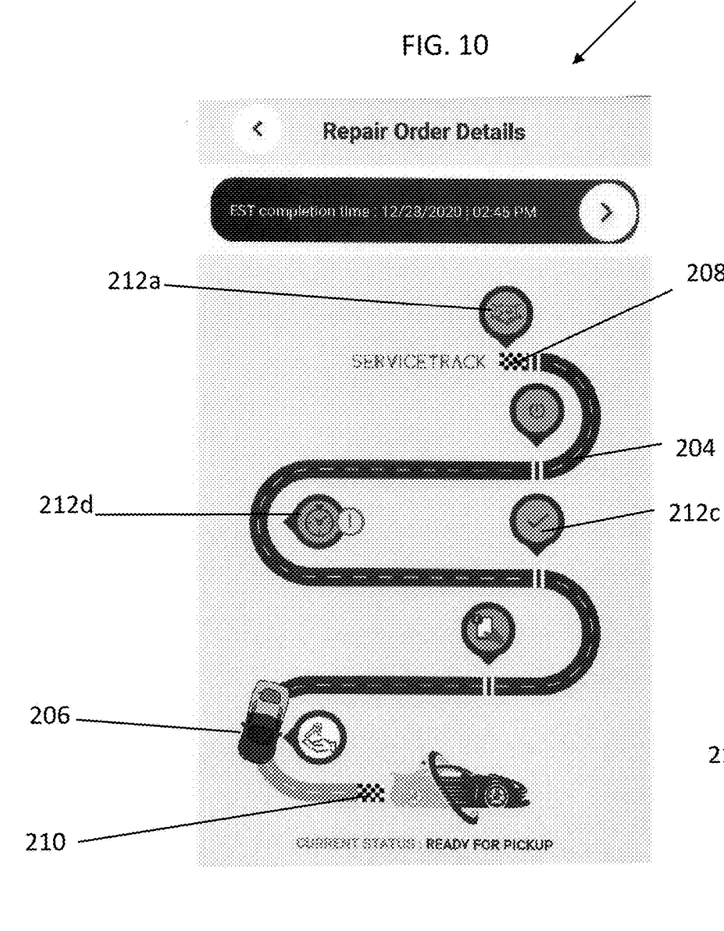
Figure 11:
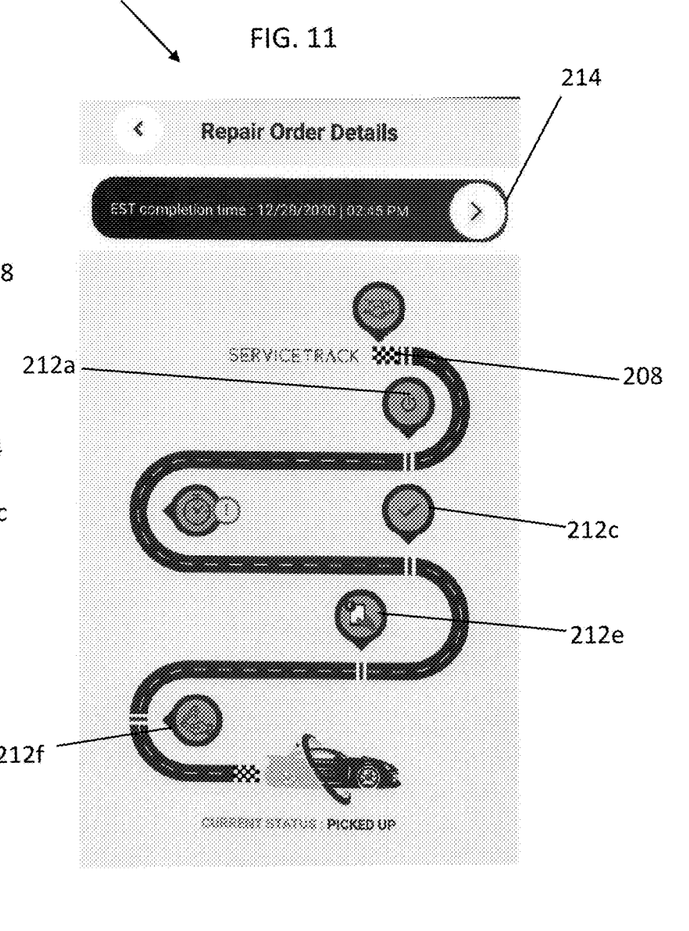

At any point during a service visit while the graphical user interface displays the road, icons and automobile, a user can contact the interactive display 304 and receive the status of the service provider transaction. For instance, as shown in FIG. 8, if the service visit has been delayed, a user can touch the alert icon 212d and an explanation of the delay will be displayed.

Although the above description with reference to particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. At least one non-transitory computer readable storage media having executable instructions stored thereon that when executed by a computer processor and coupled with an electronic device including a memory, a display, and an input device is configured to:
    (a) display a road including a service order indicator, a start point indicator, and an end point indicator arranged in spaced relation therebetween;
    (b) display an automobile at said service order indicator in response to a first input including automobile service order data, said service order indicator comprising a first color displayed prior to inputting a service order and a second color displayed when said service order is input;
    (c) move the automobile toward said start point indicator at a rate determined by an expected start time of an automobile service;
    (d) display the automobile at said start point indicator in response to an input indicating that the automobile service has begun, said start point indicator comprising a first color displayed prior to beginning the service and a second color displayed when the automobile service begins;
    (e) move the automobile toward said end point indicator at a rate determined by an expected completion time of the automobile service; and
    (f) display the automobile at said end point indicator in response to an input indicting that the automobile service is complete, said end point indicator comprising a first color displayed prior to completion of the automobile service and a second color displayed when the service is completed.

2. The at least one non-transitory computer readable storage media defined in claim 1, wherein said road further includes an alert indicator arranged between one of said service order indicator and start point indicator and said start point indicator and end point indicator.

3. The at least one non-transitory computer readable storage media defined in claim 1, said display configured to detect one of:
   (a) contact with said display wherein said display comprises a touch-sensitive display, whereby when a user contacts one of said service order indicator, start point indicator, and an end point indicator information of the automobile service is displayed;
   (b) a click input wherein said display is a point-and-click user interface, whereby when a user clicks one of said service order indicator, start point indicator, and an end point indicator information of the automobile service is displayed.

4. The at least one non-transitory computer readable storage media defined in claim 1, wherein said road further includes a checkout indicator, said non-transitory computer readable storage media further configured to:
   (a) move the automobile toward said checkout indicator in response to a second input including automobile service completion data; and
   (b) display the automobile at said checkout indicator in response to a third input including automobile transfer data, said checkout indicator comprising a first color displayed prior to automobile transfer and a second color displayed when automobile transfer is completed.

5. The at least one non-transitory computer readable storage media defined in claim 1, wherein the automobile service expected start time and completion time are calculated based on at least one service condition.

6. The at least one non-transitory computer readable storage media defined in claim 5, wherein said automobile is moved toward said start point or said send point at a rate determined by said at least one service condition, said at least one service condition being one of an availability of servicing tools and components, availability of service provider employees, a priority status of a service, and a level of difficulty of a service being provider.

7. The at least one non-transitory computer readable storage media defined in claim 5, wherein one of the automobile service expected start time and the automobile service completion time are adjusted based on an unexpected servicing need.

8. The at least one non-transitory computer readable storage media defined in claim 5, wherein the automobile service expected stat time and completion time are continuously calculated and the automobile is moved accordingly at variable rate determined by the continuous calculations.

* * * * *